(12) United States Patent
Stensson

(10) Patent No.: US 8,078,227 B2
(45) Date of Patent: Dec. 13, 2011

(54) RADIO BASE STATION SYSTEM, A NODE IN A CELLULAR MOBILE COMMUNICATIONS NETWORK, AND A SPLITTER DEVICE

(75) Inventor: Robert Stensson, Solna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 579 days.

(21) Appl. No.: 12/293,698

(22) Filed: Nov. 13, 2008

(65) Prior Publication Data
US 2009/0181722 A1    Jul. 16, 2009

(51) Int. Cl.
*H04M 1/00* (2006.01)
*H04W 4/00* (2009.01)

(52) U.S. Cl. .................... 455/562.1; 455/422.1

(58) Field of Classification Search .................. 455/403, 455/422.1, 426.2, 562.1, 73, 550.1, 561
See application file for complete search history.

(56) References Cited

U.S. PATENT DOCUMENTS
2001/0012788 A1* 8/2001 Gammon ...................... 455/562
2003/0083072 A1   5/2003 Mostafa

FOREIGN PATENT DOCUMENTS
WO   WO 2005/062476 A1   7/2005

* cited by examiner

*Primary Examiner* — David Mis

(57) ABSTRACT

The invention relates to a radio base station system for mobile communications, a node in a cellular mobile communications network, as well as a splitter device for use in a radio base system. The radio base station system comprises a first antenna and at least a first, a second and a third radio base station, the first radio base station being connected to the first antenna. The radio base station system comprises a first splitter device, which is connected to the first, the second and the third radio base station.

12 Claims, 8 Drawing Sheets

RADIO BASE STATION SYSTEM, A NODE IN A CELLULAR MOBILE COMMUNICATIONS NETWORK, AND A SPLITTER DEVICE

TECHNICAL FIELD

The present invention refers to a radio base station system for mobile communications, comprising a first antenna and at least a first, a second and a third radio base station, the first radio base station being connected to the first antenna. The invention also relates to a node in a cellular mobile communications network, as well as a splitter device for use in a radio base system.

BACKGROUND

When new cellular technologies are introduced in cellular operators' network, there is often a desire to minimise the number of additional antennas and feeders. When the global system for mobile telecommunications (GSM) was introduced in USA on existing time division multiple access (TDMA) sites, co-siting solutions minimising the number of additional antennas and feeders were developed.

FIG. 1 shows a known arrangement with a TDMA radio base station TDMA RBS, with two RX ports RXA, RXB and a TX port. The arrangement in FIG. 1 can be a standalone TDMA 1900 MHz installation with tower mounted amplifiers TMA, which are powered with DC voltage overlaid on the feeder, for optimised receiver sensitivity.

FIG. 2 shows a further example of a known arrangement. By reusing the TDMA receive (RX) antennas as transmit/receive (TX/RX) antennas for GSM, and forwarding receive signals from a GSM radio base station to a TDMA radio base station, additional antennas and feeders are avoided. As shown in FIG. 2, this is done by using a GSM radio base station GSM RBS, equipped with an antenna sharing unit ASU, as a master base station. The antenna sharing unit ASU extracts and forwards amplified receive signals to the slave TDMA radio base station TDMA RBS, via two co-siting ports RXB2, RXA2 of the master GSM radio base station.

FIG. 3 shows a known solution to introduce wide band code divisional multiple access (WCDMA) into existing sites. Two transmit/receive TX/RX ports of a WCDMA radio base station WCDMA RBS are connected to a respective master port of a respective diplex duplex unit DDU, which is a form of combiner. In addition to the master port, each diplex duplex unit has an antenna port ANT and a receive port RX and a slave port. By means of the diplex duplex units DDU, it is possible, in the arrangement in FIG. 3, to reduce the number of antenna feeders F by two. Each diplex duplex unit forwards receive signals from the antenna port to the master port, forwards receive signals from the receive port RX to the slave port, and combines transmit TX signals on the master and slave ports to the common antenna port ANT. The WCDMA radio base station is provided with two co-siting ports RXB1, RXA1, each connected to the respective receive port RX of the respective diplex duplex unit DDU. The slave port of the respective diplex duplex unit DDU is connected to a respective transmit/receive TX/RX port of a GSM base station GSM RBS. Similar to the antenna sharing unit ASU in the GSM base station in FIG. 2, the WCDMA radio base station is equipped with functions for extracting receive signals and forwarding them to the GSM base station, via the diplex duplex units DDU. The GSM base station is provided with an antenna sharing unit ASU and a TMA simulator TMAS, extracts and forwards amplified receive signals to a slave TDMA radio base station TDMA RBS. Thus, the GSM radio base station will be a slave to the WCDMA base station, and the TDMA base station will in turn be slave to the slave GSM base station.

A main drawback with the solution shown in FIG. 3 is that a receiver of the TDMA base station will be last in a quite long chain with a series of successive alternating amplifications and attentuations, which affects the TDMA receiver sensitivity negatively. More specifically, an TDMA receive signal path will pass the antenna, the tower mounted amplifier TMA, which amplifies the signal, the diplex duplex unit feeder, which attenuates the signal, the WCDMA base station (amplification), a cable (attenuation), the GSM base station (amplification), and again a cable (attenuation), to arrive at the TDMA receiver. Thus, the known solution in FIG. 3 provides a cascade of amplifier stages, and the problem with such cascading can easily be demonstrated by Friis formula:

$$NR_{TOT} = NR_1 + \frac{NR_2 - 1}{g_1} + \frac{NR_3 - 1}{g_1 \times g_2} + \frac{NR_4 - 1}{g_1 \times g_2 \times g_3} + \ldots + \frac{NR_n - 1}{g_1 \times g_2 \times g_3 \times \ldots \times g_{n-1}}$$

where
$NR_{TOT}$=total Noise Ratio,
$NR_1$, $NR_2$, etc.=Noise Ratio for each stage, and
$g_1$, $g_2$, etc.=Gain Ratio for each stage.

SUMMARY

An object of the invention is to reduce the number of antennas needed in a cellular mobile communications network.

Another object of the invention is to reduce the need for additional antennas when introducing a new technology in a cellular mobile communications network.

A further object is to improve receiver sensitivity when at least three radio base stations share antennas.

These objects are reached with a radio base station system for mobile communications, comprising a first antenna and at least a first, a second and a third radio base station, the first radio base station being connected to the first antenna, characterised in that it comprises a first splitter device, which is connected to the first, the second and the third radio base station.

Thereby, as exemplified below, the second and the third base stations are slaves that can be fed with receive signals in parallel from the first base station being a master. This provides a significantly shorter signal path for one of the slave base stations compared to the cascaded structure described above with reference to FIG. 3. This will significantly improve the receiver sensitivity of the slave base station.

Preferably, the radio base station system comprises a first signal combining device, the first radio base station being connected to the first antenna via the first signal combining device, and the first splitter device being connected to the second radio base station via the first signal combining device. Thus, the first signal combining device is connected to the first antenna, the first and second radio base stations, and the first splitter device. The first signal combining device is preferably adapted to combine signals from the first and second radio base station for transmission by the first antenna. Thereby, the first signal combining device can feed a receive signal from the first splitter device to the second base station and also feed a transmit signal from the second base station to the first antenna.

Preferably the radio base station system comprises a second antenna and a second splitter device, the first radio base station being connected to the second antenna, and the second splitter device being connected to the first, the second and the third radio base station. Using the first and second antenna in combination provides antenna diversity, i.e. information-carrying signals are transmitted along different propagation paths. By providing a first and second splitter device in said manner, the system provides antenna diversity in addition to the possibility for the second and the third base station slaves to receive the signals in parallel from the first base station master, regardless whether the signals were received by the first or the second antenna. Thus the signal paths from both antennas are significantly shorter or one of the slave base stations, compared to the cascaded structure described above with reference to FIG. 3.

Preferably, the first radio base station is connected to an input of the first splitter device, and the second and third radio base stations are connected to a respective output of the first splitter device. In addition in case the radio base station system comprises a second splitter device the first radio base station is connected to an input of the second splitter device and the second an third radio base stations are connected to a respective output of the second splitter device.

Preferably, the radio base station system comprises extraction means adapted to extract, from signals received by the first antenna and/or the second antenna, signals for the first radio base station.

Preferably, the first splitter device presents at least two outputs, at least one of the outputs being connected to a simulation device (TMAS), adapted to simulate a tower mounted amplifier (TMA). As described closer below, this will significantly improve the possibilities of adapting, into the inventive radio base system, certain types of radio base stations as slaves. This advantage is also provided by a splitter device according to claim 12.

The objects above are also reached with a node, in a cellular mobile communications network, according to claim 13.

DESCRIPTION OF THE DRAWINGS

Below, the invention will be described in greater detail with reference to the drawings, in which.

DETAILED DESCRIPTION

Figure 4:
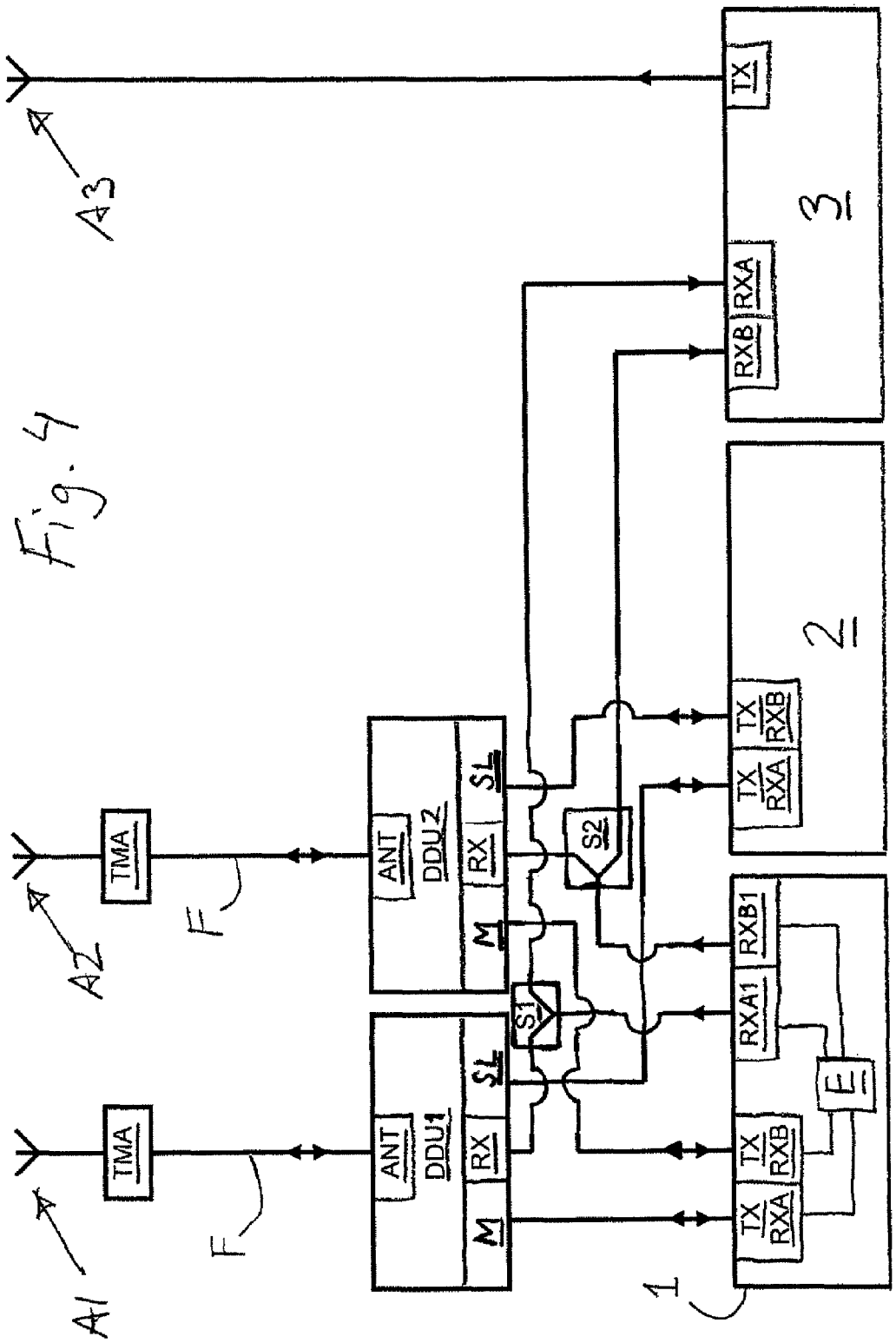
FIG. 4 shows a block diagram depicting a radio base station system according to a preferred embodiment of the invention.

FIG. 4 shows a radio base station system according to one embodiment of the invention, for cellular network mobile communications. The radio base station system comprises a first radio base station 1, in the form of a WCDMA base station 1, a second radio base station 2, in the form of a GSM radio base station 2, and a third base station 3, in the form of a TDMA base station 2, and a first antenna A1 for transmission and reception of radio signals. The first radio base station 1 is connected to the first antenna A1 via a first signal combining device DDU1, in the form of a diplex duplex unit, in itself known in the art. More specifically, the first antenna A1 is connected, via a tower mounted amplifier TMA and a feeder F, to an antenna port ANT of the first signal combining device DDU1, and a first transmit and receive port TXRXA of the first base station 1 is connected to a master port M of the first signal combining device DDU1.

The radio base station system comprises a first splitter device S1, described closer below with reference to FIG. 5 and FIG. 6, which is connected to the first, the second, and the third radio base station 1, 2, 3. In case of the first splitter device S1 and the second base station 2, the latter is connected to the former via the first signal combining device DDU1. More specifically, a first branch of the first splitter device S1 is connected to a first co-siting port RXA1 of the first base station 1. A second branch of the first splitter device S1 is connected to a receive port RX of the first signal combining device DDU1, and a slave port SL of the first signal combining device DDU1 is connected to a first transmit and receive port TXRXA of the second base station 2. A third branch of the first splitter device S1 is connected to a first receive port RXA of the third base station 3. Here the first branch of the splitter device S1 is also referred to as an input, and the second and third branches are also referred to as outputs.

The first radio base station 1 comprises extraction means E to extract, from signals received by the first antenna A1, signals for the first radio base station 1. The extraction means E can comprise an antenna sharing unit (ASU), adapted to extract signals with a frequency for the first base station, and also to forward amplified signals.

In addition, the first signal combining device DDU1 is adapted to combine signals from the first and second radio base station 1, 2 for transmission by the first antenna A1. More specifically, transmit signals received by the master port M of the first signal combining device DDU1 from the first transmit and receive port TXRXA of the first base station 1, and transmit signals received by the slave port SL of the first signal combining device DDU1 from the first transmit and receive port TXRXA of the second base station 2, are combined by the first signal combining device DDU1 and received by the first antenna A1 via the antenna port ANT.

Still referring to FIG. 4, to provide antenna signal diversity, the radio base station system comprises a second antenna A2 for transmission and reception of radio signals, connected to the base stations 1, 2, 3 in a manner corresponding to the manner in which the first antenna is incorporated. Thus, the second antenna A2 is connected, via a tower mounted amplifier TMA and a feeder F, to an antenna port ANT of a second signal combining device DDU2, and a second transmit and receive port TXRXB of the first base station 1 is connected to a master port M of the second signal combining device DDU2. By the second antenna, a tower mounted amplifier TMA is provided. A first branch of a second splitter device S2 is connected to a second co-siting port RXB 1 of the first base station 1. A second branch of the second splitter device S2 is connected to a receive port RX of the second signal combining device DDU2, and a slave port SL of the second signal combining device DDU2 is connected to a second transmit and receive port TXRXB of the second base station 2. A third branch of the second splitter device S2 is connected to a second receive port RXB of the third base station 3. The extraction means E of the first radio base station is adapted to extract, from signals received by the second antenna A2, signals for the first radio base station 1. Transmit signals received by the master port M of the second signal combining device DDU2 from the second transmit and receive port TXRXB of the first base station 1, and transmit signals received by the slave port SL of the second signal combining device DDU2 from the second transmit and receive port TXRXB of the second base station 2, are combined by the second signal combining device DDU2 and received by the second antenna A2 via the antenna port ANT.

For transmission from the third radio base station 3, a third antenna A3 is connected to a transmission port TX of the third base station 3.

In operation of the radio base station system in FIG. 4, signals received by the first and second antenna A1, A2 pass the respective antenna ports ANT and master ports M, and are received at the first and second transmit and receive port TXRXA, TXRXB, respectively, of the first base station 1. The extraction means E in the first base station 1 extracts from the signals received, signals intended for the first base station. Further, the signals received by the first and second antenna A1, A2 pass the first and second co-siting ports, RXA1, RXB1, respectively, of the first base station 1, and are received by the respective first branches of the first and second splitter devices S1, S2. The respective second branches of the splitter devices S1, S2 output the signals which are received by the respective receive ports RX of the first and second signal combining devices DDU1, DDU2, which feed them via the respective slave ports SL to the first and second transmit and receive ports TXRXA, TXRXB, respectively, of the second base station. The respective third branches of the splitter devices S1, S2 output the signals so that they are received by the first and second receive ports RXA, RXB, respectively, of the third base station. The second and third base station 2, 3 can comprise suitable means, for example comprising one or more filters, to extract from the signals received, signals intended for respective base stations.

Figure 3:
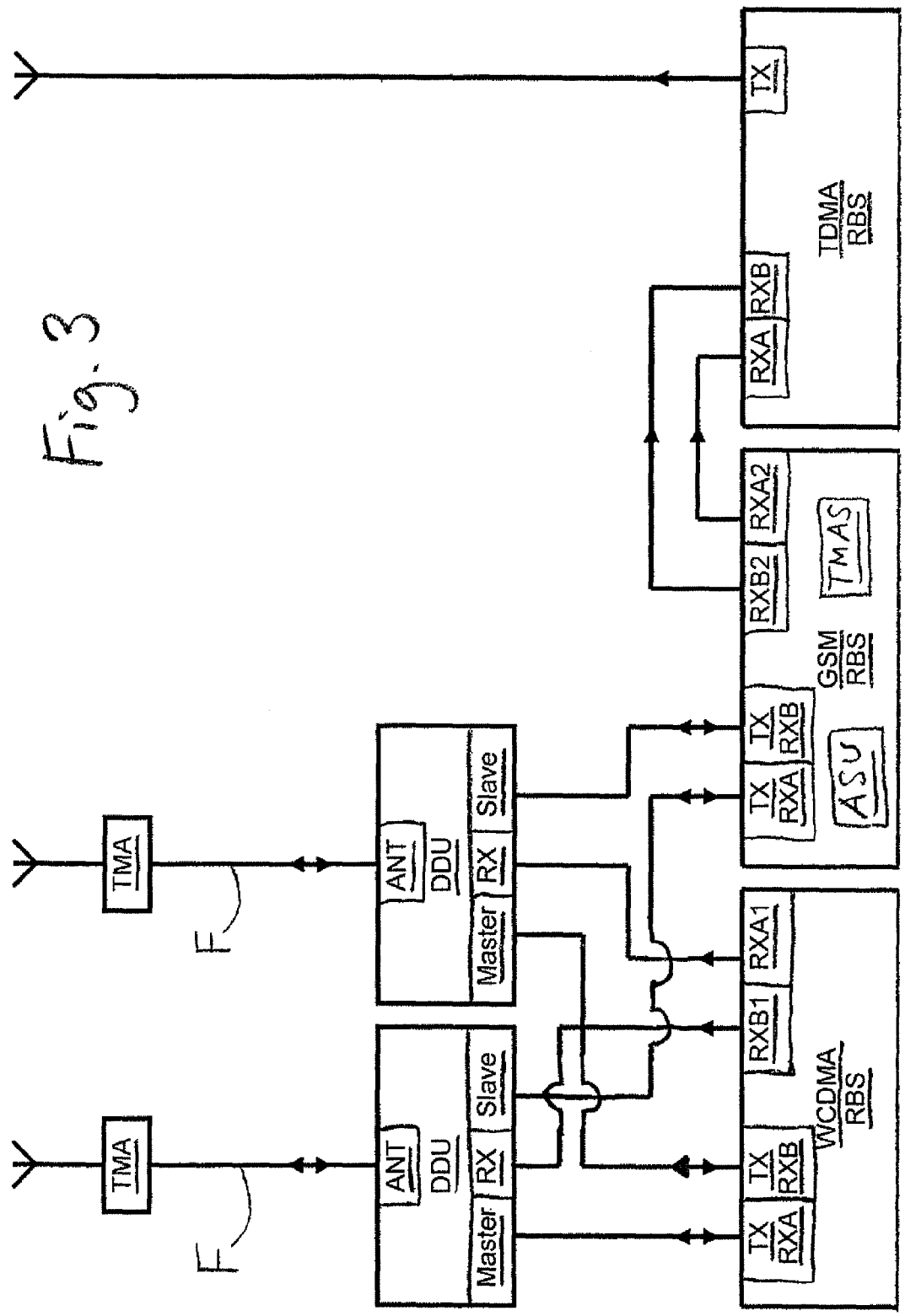

Thus, the concept of the embodiment of the invention shown in FIG. 4, is to feed the slave GSM (second) radio base station 2, and slave TDMA (third) radio base station 3, with receive (RX) signals in parallel from the WCDMA master (first) radio base station 1. More generally, the invention will improve the resulting noise figure of the third radio base station 3 compared to the known solution described above with reference to FIG. 3. The receive signal path for the third base station 3 will be reduced to passing the antennas, the tower mounted amplifiers TMA (amplification), the feeders (attenuation), the first base station 1 (amplification), cables and splitter devices S1, S2 (attenuation), to a receiver in the third base station 3.

Figure 1:
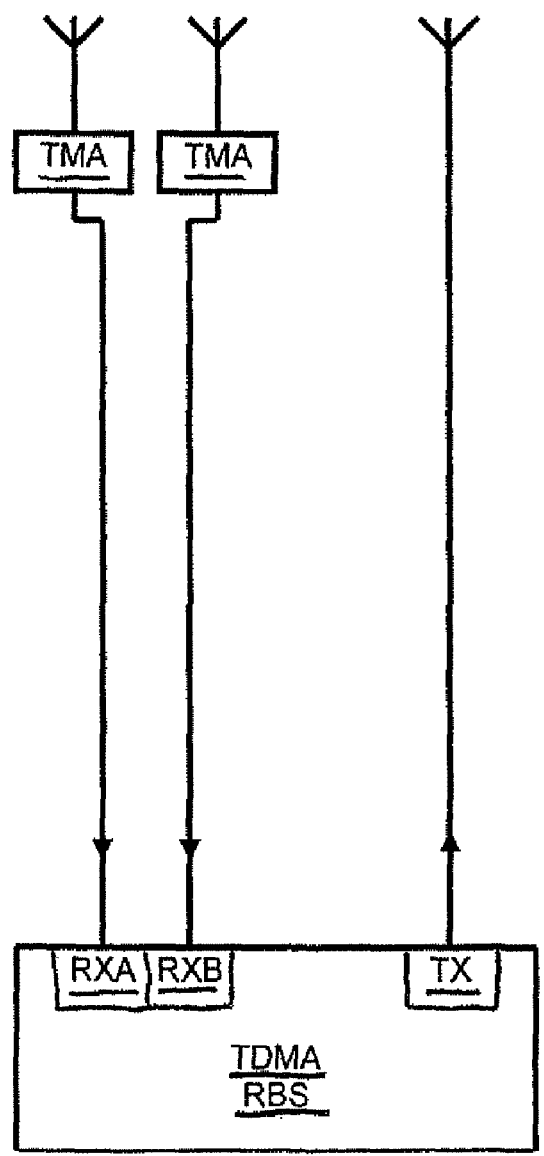
FIG. 1-3 show block diagrams depicting radio base station systems according to known solutions.
Figure 2:
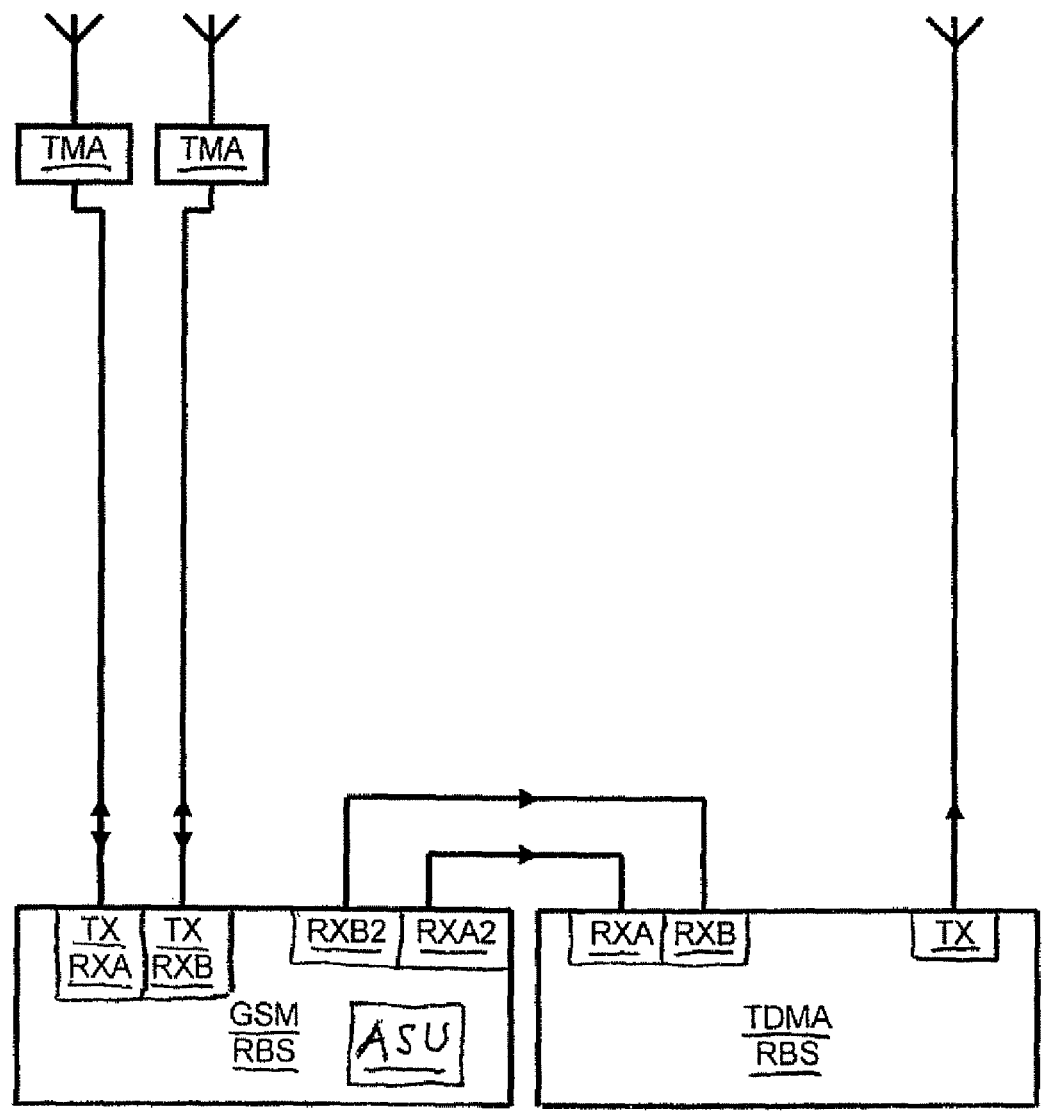

As a specific example of the advantage of the invention: When introducing, in a manner according to the invention, a WCDMA base station to an arrangement with a GSM and a TDMA base station, as depicted in FIG. 2, the TDMA receive (RX) noise figure will remain essentially the same as before adding the WCDMA base station. It can easily be proven that the resulting TDMA receive (RX) noise figure will be improved by using the invention, compared to the known solution described above with reference to FIG. 3. The GSM noise figure will be unaffected since the splitter device S1, S2 loss can be seen as a part of the cable loss between the WCDMA base station and GSM base station, as long as sufficient gain is available from the WCDMA base station.

It should be noted that the invention can be used in other co-siting applications, where a radio base station for a mobile communications standard different from WCDMA, e.g. GSM, TDMA or some other standard, is to be incorporated into an existing base station system. For example, the first, second and third base stations as described above can be GSM, WCDMA and TDMA base stations, respectively, or TDMA, WCDMA and GSM base stations, respectively.

The splitter devices S1, S2 can be equal splitters, which means that they provide the same power on both outputs, or unequal splitters, also known as tappers, which provide different power levels on the two outputs. The type of splitter devices used is preferably dependent on the required RF signal levels to the second and third base stations 2, 3.

Figure 5:
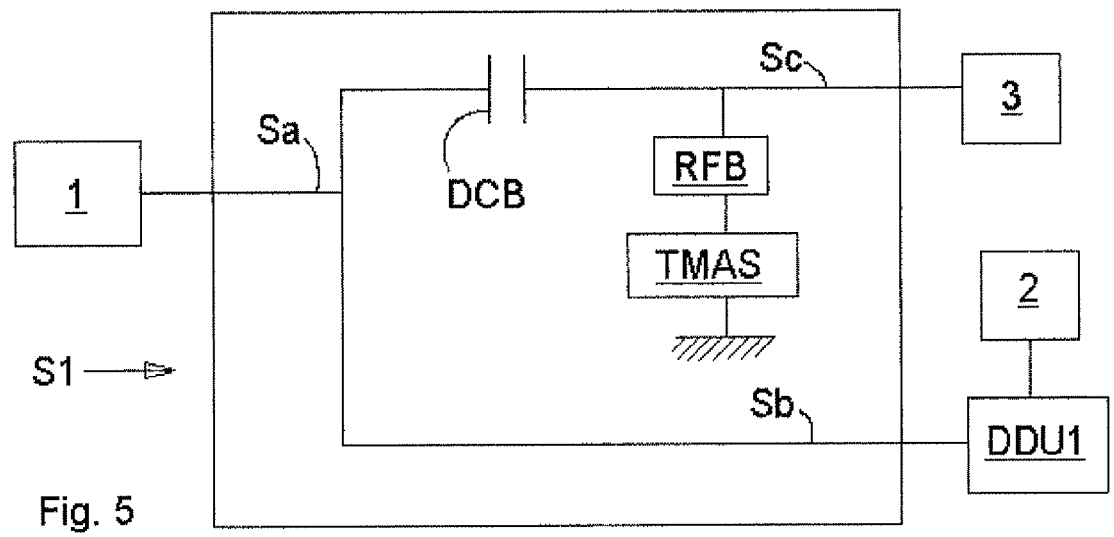
FIGS. 5 and 6 show block diagrams depicting alternative embodiments of a splitter device to be used in the radio base station system of FIG. 4, and FIGS. 7 and 8 show block diagrams depicting radio base station systems according to alternative embodiments of the invention.
Figure 6:
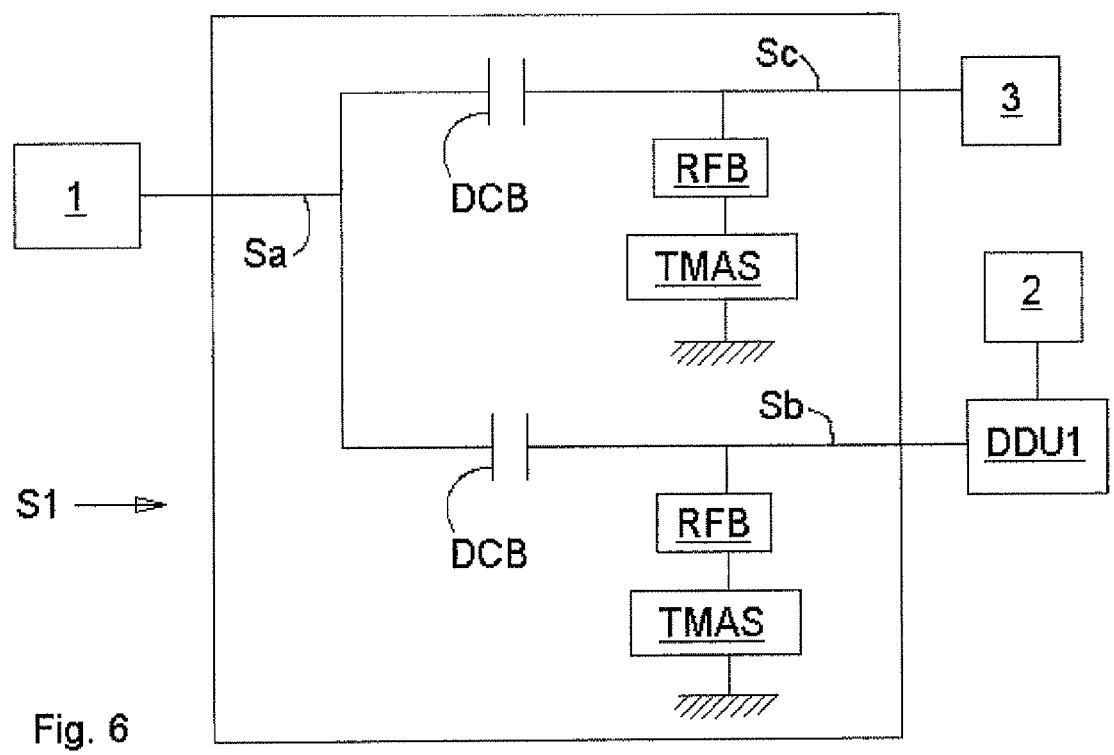

Reference is made to FIG. 5 and FIG. 6, showing respective embodiments of a splitter device S1 to be used, as the first and second splitter devices S1, S2, in the radio base system according to the invention. In general, the splitter devices S1, S2 can be standard splitters or tappers. However, the splitter device embodiments in FIG. 5 and FIG. 6 will improve the possibilities of adapting certain makes of TDMA radio base stations as slaves, in order for such base stations to enter the correct operational state, and to avoid short circuiting of DC voltage in the slave. More specifically, certain makes of TDMA radio base stations have a DC voltage on the receive port for a tower mounted amplifier in a traditional installation, and a DC current through the receive port is needed in order for the base station to operate correctly. When connecting such a receive port, according to the present invention, to a splitter device, the latter can be arranged as described below to avoid short circuiting of the DC voltage.

As described above, a first branch Sa, the splitter input, is connected to the first radio base station 1, a second branch Sb, one of the outputs, is connected to the second radio base station 2, via the first signal combining device DDU1, and a third branch Sc, the other output, is connected to the third radio base station 3. As can be seen in FIG. 5, a simulation device TMAS, adapted to simulate a tower mounted amplifier (TMA), is provided at the third branch Sc. The TMA simulator TMAS is connected to the third branch and to ground. Between the TMA simulator TMAS and the first branch Sa, a DC current blocking device DCB is provided, for example in the form of a resistor, to prevent DC current from reaching the first branch and result in short circuiting. Thus, the DC current from the third base station will reach the TMA simulator TMAS. In addition, between the TMA simulator TMAS and the third branch Sc, a RF blocking device RFB, for example in the form of a low pass filter, is provided to direct signals from the antenna(s) to the third base station 3. In the alternative embodiment shown in FIG. 6, a TMA simulator TMAS, DC current blocking device DCB, and a RF blocking device RFB are provided in a similar manner at the second branch Sb, as well.

The TMA simulator TMAS provides a load that is at a level of the load that is provided by a tower mounted amplifier TMA for which the radio base station is adapted for. Providing a TMA simulator TMAS at a splitter device output Sb, Sc will solve the DC problem mentioned above, and the slave radio base station 2, 3 connected to the output will behave as if it has a tower mounted amplifier TMA connected to it.

As an alternative to the splitter devices in FIGS. 5 and 6, a DC block with a (TDMA) TMA simulator provided externally of a standard splitter or tapper can be used. Also, two splitter devices S1, S2 (splitters or tappers), provided with TMA simulators TMAS can be integrated as one physical unit, which is advantageous from an installation point of view.

Figure 7:
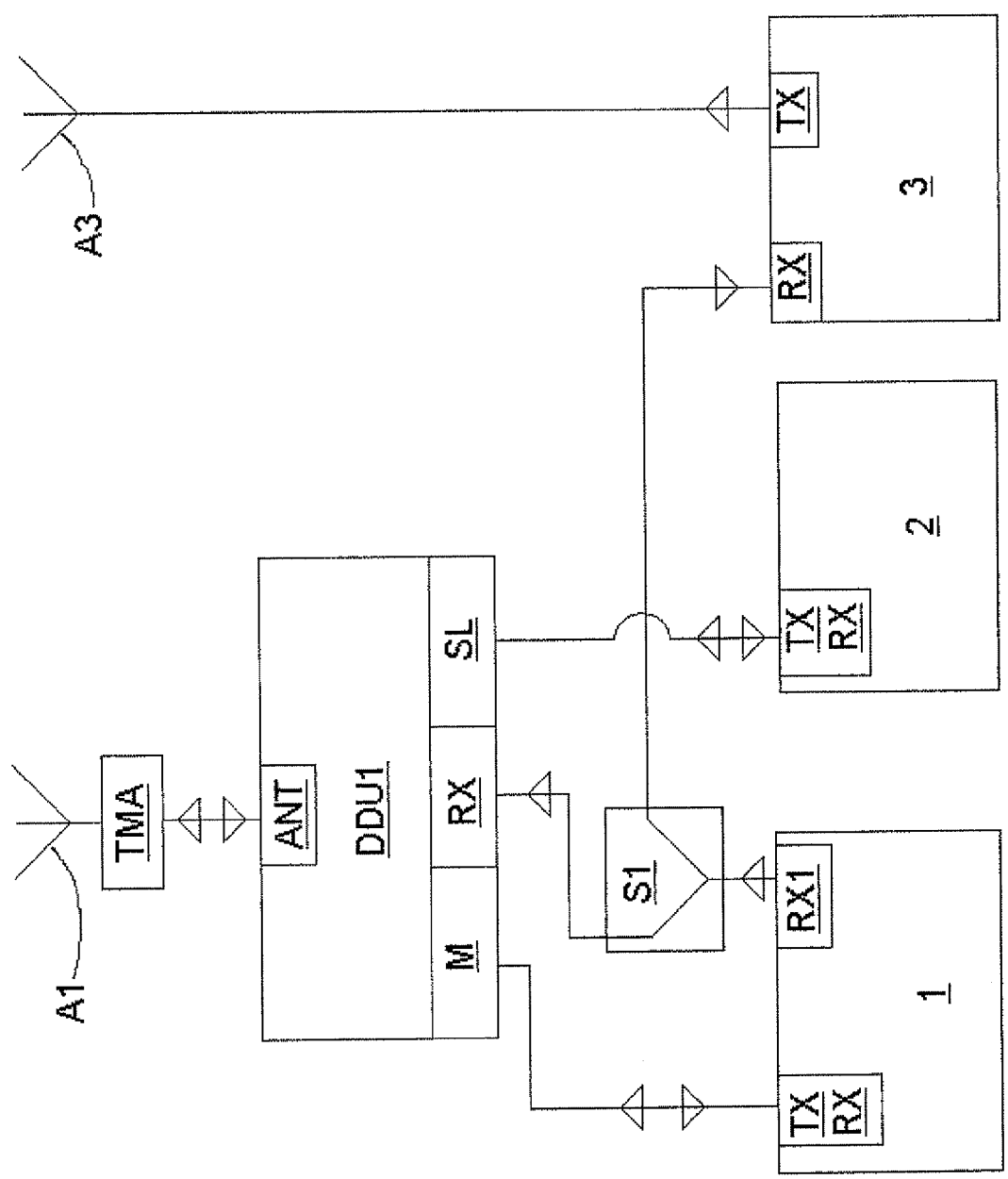

Reference is made to FIG. 7. As mentioned, the example described above with reference to FIG. 4 is adapted to provide antenna signal diversity, by presenting a first and a second antenna A1, A2 for transmission and reception of radio signals. However, the invention is also applicable to a radio base station system in which no such double antenna arrangement is arranged. FIG. 7 shows an example of such a system, and it corresponds to the system in FIG. 4, with the difference that no second antenna A2, no second signal combining device DDU2, and no second splitter device S2 are provided.

Figure 8:
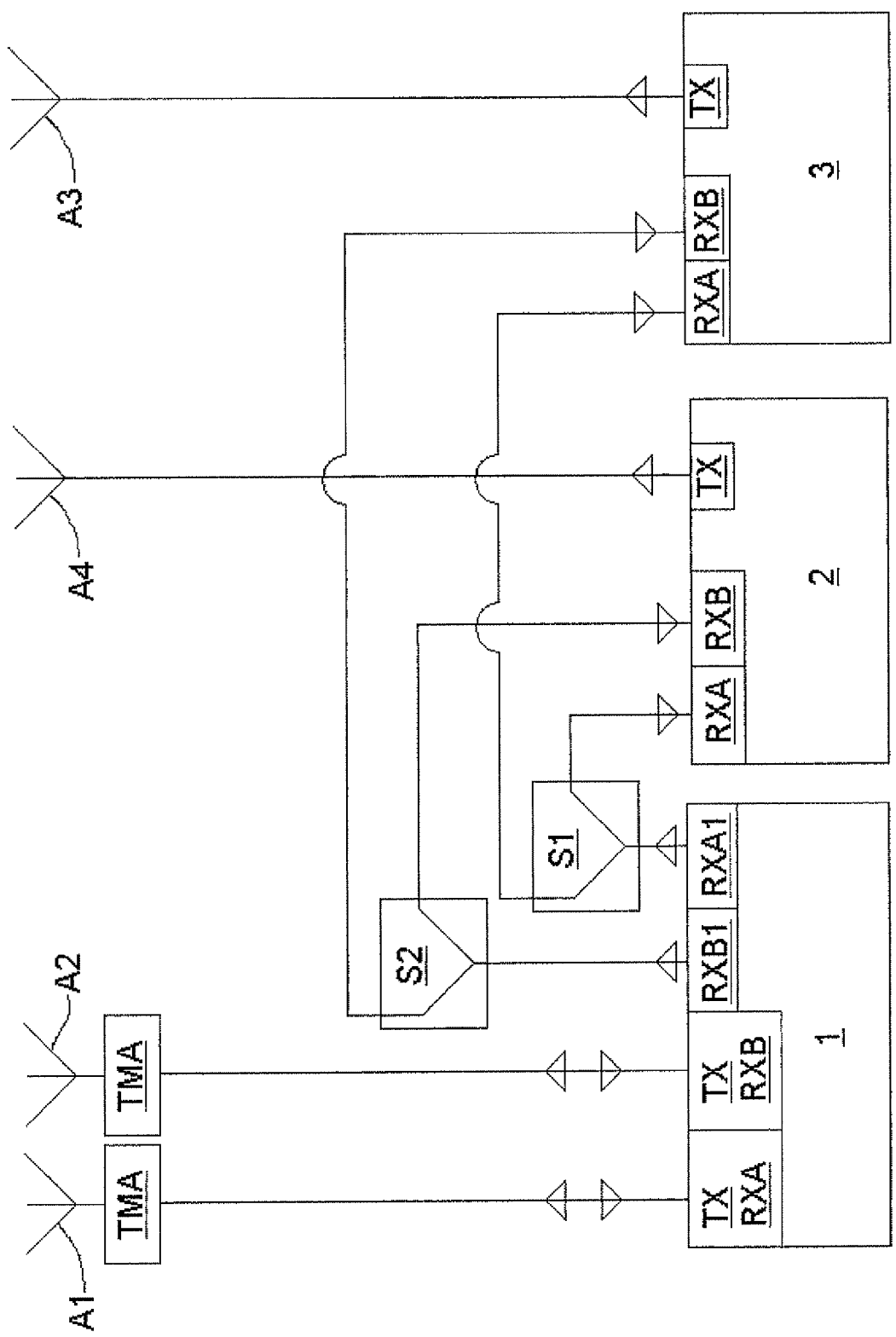

FIG. 8 shows an alternative embodiment of the invention. The radio base system in FIG. 8 corresponds to the one described above with reference to FIG. 4, except for the following differences: The first and a second antenna A1, A2, for transmission and reception of radio signals, are connected to the first radio case station 1, without any interposed signal combining device. More specifically, the first and second antennas A1, A2 are connected to a first and second transmit and receive port TXRXA, TXRXB, respectively. Further, the first and the second splitter device S1, S2 are connected to the second base station 2, without any interposed signal combining device. More specifically, a respective output of the first and the second splitter device S1, S2 are connected to a first and a second receive port RXA, RXB, respectively, of the second base station 2. For transmission from the second radio base station 2, a fourth antenna A4 is connected to a transmission port TX of the second base station 2.

Figure 9:
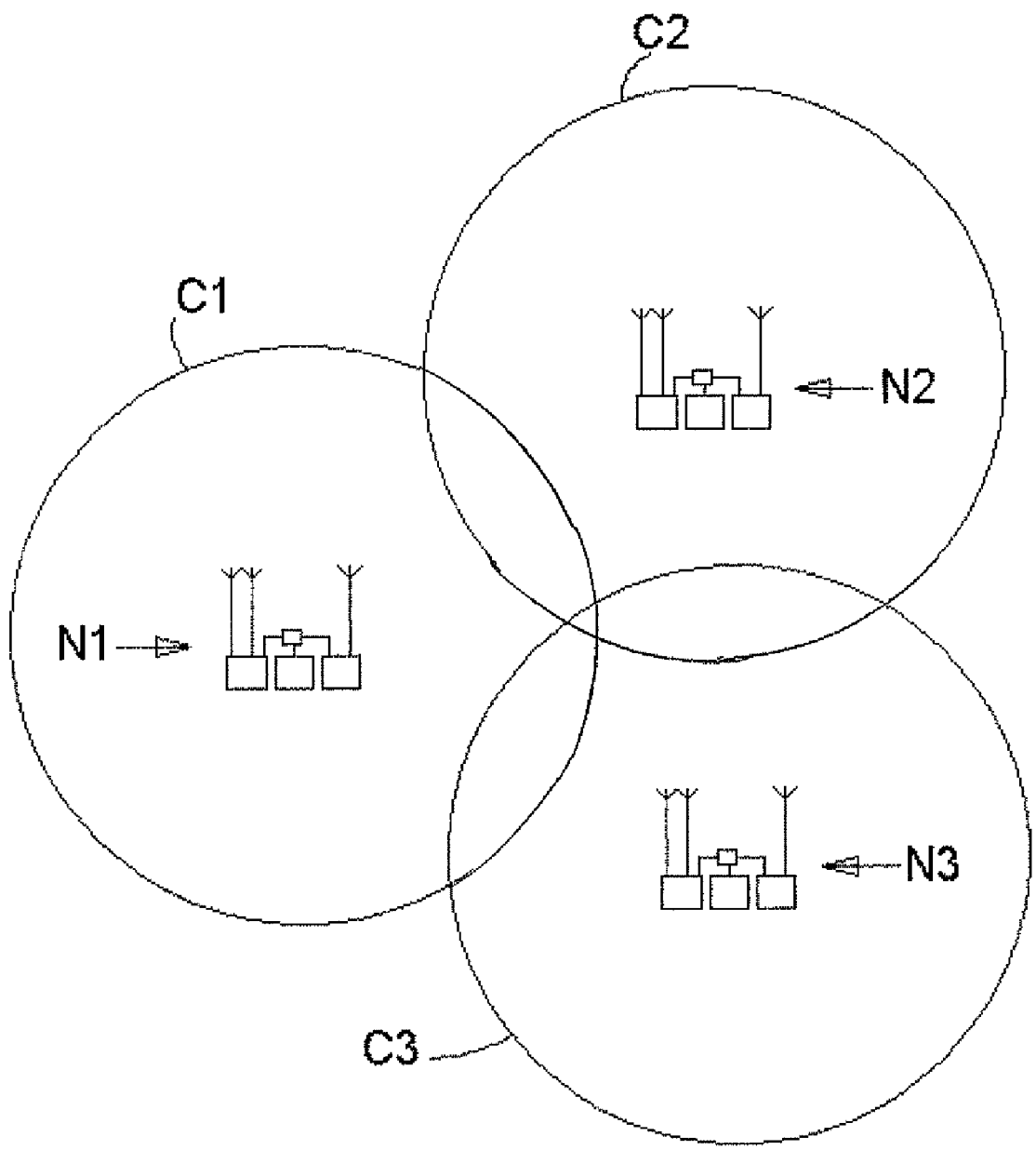
FIG. 9 shows schematically a part of a cellular mobile communications network with nodes, each comprising a radio base station system according to the invention.

FIG. 9 shows schematically a part of a cellular mobile communications network, with cells C1, C2, C3, in which radio coverage is provided by nodes N1, N2, N3, each comprising a radio base station system according to any of the embodiments described above.

The invention claimed is:

1. A radio base station system for mobile communications, comprising:
   a first antenna;
   at least a first, a second and a third radio base station, the first radio base station being connected to the first antenna, comprising a first splitter device, which is connected to the first, the second and the third radio base station; and
   a first signal combining device, wherein the first radio base station is connected to the first antenna via the first signal combining device, and the first splitter device is connected to the second radio base station via the first signal combining device.

2. A radio base station system according to claim 1, wherein the first signal combining device is adapted to combine signals from the first and second radio base station for transmission by the first antenna.

3. A radio base station system according to claim 1, wherein the first radio base station is connected to an input of the first splitter device, and the second and third radio base stations are connected to a respective output of the first splitter device.

4. A radio base station system according to claim 1, comprising extraction means adapted to extract, from signals received by the first antenna, signals for the first base station.

5. A radio base station system according to claim 1, comprising a second antenna and a second splitter device, the first radio base station being connected to the second antenna, and the second splitter device being connected to the first, the second and the third radio base station.

6. A radio base station system according to claim 5, comprising a second signal combining device, the first radio base station being connected to the second antenna via the second signal combining device, and the second splitter device being connected to the second radio base station via the second signal combining device.

7. A radio base station system according to claim 6, wherein the second signal combining device is adapted to combine signals from the first and second radio base station for transmission by the first antenna.

8. A radio base station system according to claim 5, wherein the first radio base station is connected to an input of the second splitter device, and the second and third radio base stations are connected to a respective output of the second splitter device.

9. A radio base station system according to claim 5, the further comprising extraction means that are adapted to extract, from signals received by the second antenna, signals for the first radio base station.

10. A radio base station system according to claim 1, wherein the first splitter device presents at least two outputs, at least one of the outputs being connected to a simulation device, adapted to simulate a tower mounted amplifier.

11. A splitter device for use in a radio base station system according to claim 1, wherein it presents at least two outputs, at least one of the outputs being connected to a simulation device, adapted to simulate a tower mounted amplifier.

12. A node in a cellular mobile communications network, comprising a radio base station system according to claim 1.

* * * * *

UNITED STATES PATENT AND TRADEMARK OFFICE
CERTIFICATE OF CORRECTION

| | | |
|---|---|---|
| PATENT NO. | : 8,078,227 B2 | Page 1 of 1 |
| APPLICATION NO. | : 12/293698 | |
| DATED | : December 13, 2011 | |
| INVENTOR(S) | : Stensson | |

It is certified that error appears in the above-identified patent and that said Letters Patent is hereby corrected as shown below:

In Column 2, Line 7, delete "attentuations," and insert -- attenuations, --, therefor.

In Column 3, Line 1, delete "Preferably" and insert -- Preferably, --, therefor.

In Column 3, Line 13, delete "Thus" and insert -- Thus, --, therefor.

In Column 3, Line 14, delete "or" and insert -- for --, therefor.

In Column 3, Line 20, delete "addition" and insert -- addition, --, therefor.

In Column 3, Line 21, delete "device" and insert -- device, --, therefor.

In Column 3, Line 22, delete "device" and insert -- device, --, therefor.

In Column 3, Line 23, delete "an third" and insert -- and third --, therefor.

In Column 8, Line 28, in Claim 9, delete "claim 5, the" and insert -- claim 5, --, therefor.

Signed and Sealed this
Fourteenth Day of February, 2012

David J. Kappos
*Director of the United States Patent and Trademark Office*